United States Patent [19]

Parrick et al.

[11] 4,385,912

[45] May 31, 1983

[54] APPARATUS FOR EXTRACTING LIQUID AND FOAM FROM GAS

[75] Inventors: C. Earl Parrick, Seattle; Forrest B. Busching, Tacoma, both of Wash.

[73] Assignee: The Boeing Company, Seattle, Wash.

[21] Appl. No.: 307,179

[22] Filed: Sep. 30, 1981

[51] Int. Cl.³ .................. B01D 45/06; B01D 45/16; B01D 50/00; B01D 19/02
[52] U.S. Cl. ..................... 55/329; 55/178; 55/184; 55/192; 55/204; 55/337; 55/385 C; 55/432; 4/209 R; 4/347
[58] Field of Search .............. 55/178, 184, 192, 204, 55/207, 316, 329, 337, 385 C, 432, 447, 459R, 526; 4/209 R, 306, 321, 347, 209 FF; 251/299

[56] References Cited

U.S. PATENT DOCUMENTS

| | | | |
|---|---|---|---|
| 1,085,245 | 1/1914 | Cowdrey | 251/299 |
| 1,355,617 | 10/1920 | Niemeyer | 55/432 |
| 2,256,524 | 9/1941 | McKelvey | 55/184 |
| 2,514,623 | 7/1950 | Brown | 55/337 |
| 2,569,865 | 10/1951 | Muska | 55/329 |
| 2,790,554 | 4/1957 | Work | 55/459 R |
| 3,499,270 | 3/1970 | Paugh | 55/337 |
| 4,092,137 | 5/1978 | Howe et al. | 55/184 |
| 4,158,449 | 6/1979 | Sun et al. | 55/526 |

FOREIGN PATENT DOCUMENTS 71933  6/1944  Norway ................. 55/449

Primary Examiner—David L. Lacey
Attorney, Agent, or Firm—Christensen, O'Connor, Johnson & Kindness

[57] ABSTRACT

A liquid/gas separator for removing entrained liquid from a gas stream is mounted in the wall of a liquid holding tank and extends at least partially within the tank. The separator includes a gas circulation pathway and has a plurality of inlets through which the gas stream enters the circulation pathway. The inlets are arranged to impart a curved direction of flow to the gas stream. A fluid collection plate extends from the gas circulation pathway and is in fluid communication with it. The liquid collection plate is conical and provides a path of decreasing radius for the gas stream. The swirling motion of the stream over the collection plate causes a major portion of the liquid to separate from the gas and collect on the plate surface. The liquid collection plate has an opening formed therein through which the liquid can drain into the tank. The gas stream flows from the liquid collection plate upwardly through a mist elimination chamber preferably filled with an adsorbent demister material and passes to the open atmosphere.

7 Claims, 2 Drawing Figures

APPARATUS FOR EXTRACTING LIQUID AND FOAM FROM GAS

BACKGROUND OF THE INVENTION

This invention relates to separators for removing entrained liquids from gases and more particularly relates to a liquid/gas separator for use in the vent outlet of a waste holding tank.

Toilet systems have been developed for aircraft which use an air pressure differential to move refuse from the toilets to a waste holding tank. During the flushing cycle, refuse and flushing liquid mix with air as they travel to the waste holding tank. As the air, refuse and flushing liquid enters the holding tank air present within the holding tank passes from the tank through a vent outlet in the tank wall. In most instances, the air leaving the holding tank is vented over board of the aircraft to the atmosphere. It is necessary that the air thus vented be free of liquid, foam and mist for both sanitary and aesthetic reasons. Also, in most such toilet systems, a vacuum blower is located in the air exhaust line from the waste holding tank and is utilized at low altitudes and for ground operation to provide the pressure differential used to move refuse from the toilet to the holding tank. The air leaving the holding tank passes through that blower; therefore, it is necessary that the air venting from the waste holding tank be free from moisture so as to prevent damage to the vacuum blower.

Because of the environment in which the separator is to be used, it is desirable to make the separator easily accessible for maintenance and cleaning. Also, since the pressure differential utilized in typical toilet flushing systems is generally in the neighborhood of only 6 to 8 p.s.i. (12–16 in. Hg.) it is necessary that the separator have a low pressure drop across it so as not to impede air flow through the separator so that there will be a minimal effect on the flushing action.

More of the liquid/gas separators presently existing are designed for mounting entirely outside the holding tank in the vent line. In an aircraft system space is always at a premium, therefore, it is desirable to have the separator be at least partially within the tank to minimize space requirements and to allow separated moisture to drain from the separator to the tank without additional plumbing.

It is therefore an object of the present invention to provide a liquid/gas separator that is easily mounted in the outlet of a liquid holding tank.

It is also an object of the present invention to provide a separator that is mounted at least partially within the holding tank itself.

It is another object of the invention to provide a separator which has a low pressure drop across it relative to the air flow through the separator.

SUMMARY OF THE INVENTION

In accordance with the above stated objects, a liquid/gas separator is provided that is particularly useful in the vent outlet from a waste holding tank associated with a vacuum flush toilet system. The separator includes an outer cylindrical wall having a plurality of inlet openings formed therein. The inlet openings permit the passage of a stream of gas and entrained liquid into the space bounded by the cylindrical wall. The inlet openings are formed so as to impart a direction to the stream passing through them so that the stream, upon entering the interior space, travels in a direction substantially tangential to the cylindrical wall. An inner cylindrical wall having a diameter less than the outer wall is positioned coaxially with the outer wall. The air stream passing through the inlets of the outer wall circulates around the inner cylindrical wall within the space between the inner and outer walls. As the stream circulates it tends to spiral downwardly. A liquid collecting cone is affixed to a lower edge of the outer wall and converges downwardly and has a liquid outlet at its apex. An inner cone is oriented parallel to and spaced from the liquid collecting cone and has its base contiguous with the lower edge of the inner cylindrical wall. The space between the liquid collecting cone and the inner cone is in fluid communication with the space between the outer cylindrical wall and the inner cylindrical wall. As the air stream spirals downwardly it enters the space between the two cones. The air entering the space between the liquid collecting and inner cones travels in a circular path and the two cones tend to direct the air in a downward spiral. The swirling action causes the heavier water particles entrained in the air stream to collect on an inner surface of the liquid collecting cone. The inner cone is truncated and is open at the truncation to permit the flow of air from the space between the liquid collecting cone and the inner cone up into the interior space bounded by the inner cone. From the space interior to the inner cone the gas passes upwardly into the space bounded by the inner cylindrical wall and through an outlet to the ambient air surrounding the separator. Preferably the space bounded by the inner cylindrical wall is filled with a demister, i.e., a material that adsorbs any remaining liquid particles from the air stream prior to the passage of the air stream to the ambient air but allows the air to flow substantially unimpeded.

Preferably, when the separator is used in a toilet system, the effluent and air stream from the toilet has imparted to it upon entering the holding tank a curved trajectory substantially tangential to the inner surface of the tank. The air inlets of the separator are then arranged so that the direction of entry of the liquid/gas stream into the inlets is in a direction opposite to the direction imparted to the air and effluent entering the holding tank.

BRIEF DESCRIPTION OF THE DRAWINGS

The invention disclosed herein will be better understood by those of ordinary skill in the art and others upon reading the ensuing specification when taken in conjunction with the attached drawings wherein.

DETAILED DESCRIPTION OF THE PREFERRED EMBODIMENT

Figure 1:
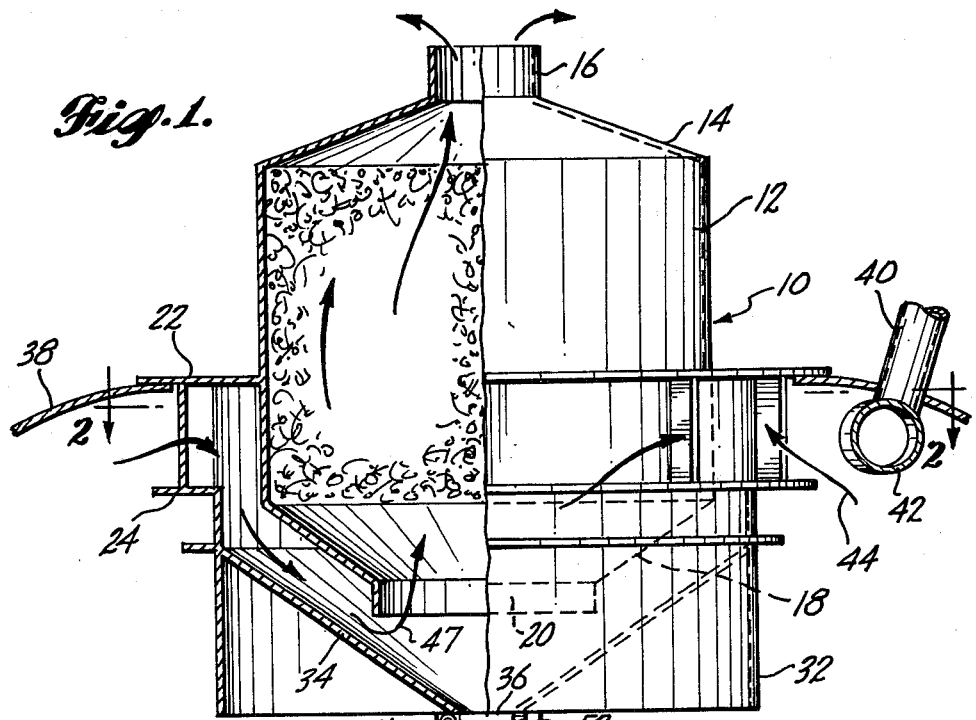
FIG. 1 is a side elevational view in partial section of a liquid/gas separator made in accordance with the principles of the present invention mounted in an outlet of a waste holding tank.
Figure 2:
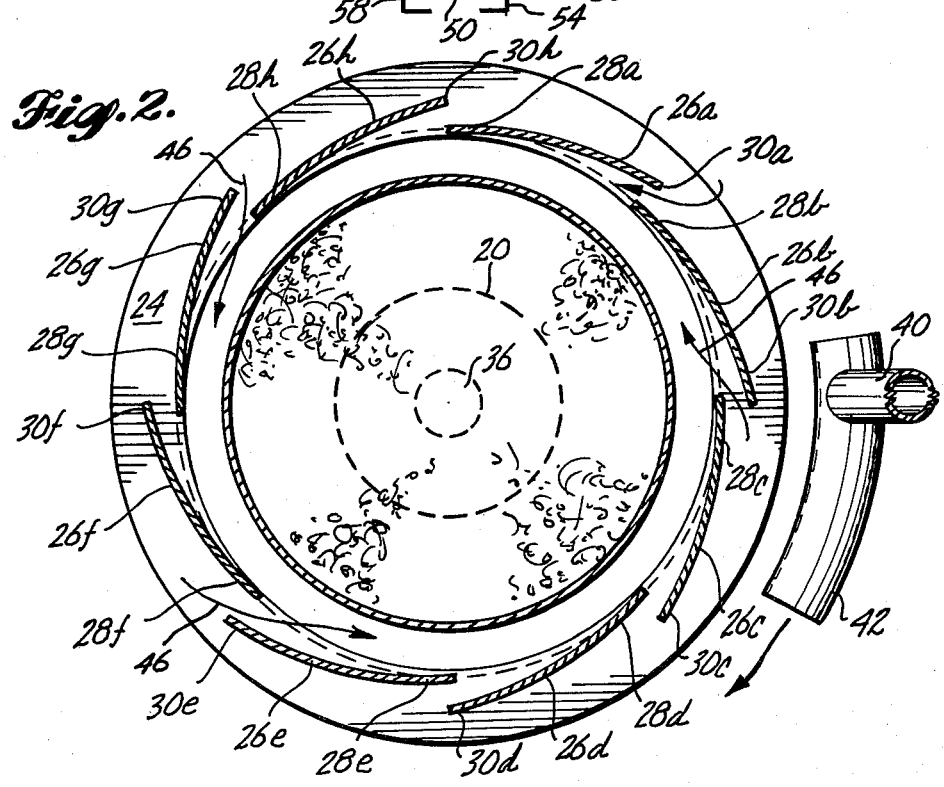
FIG. 2 is a section view of the liquid/gas separator of FIG. 1 taken along the line 2—2 of FIG. 1.

A preferred embodiment of a liquid and foam extracting apparatus made in accordance with the principles of the present invention, is pictured in FIGS. 1 and 2. While the separator will be described herein, used in a waste holding tank of a toilet system, it should be remembered that the separator can be used in any environment where it is desired to separate liquid from a gas stream exiting a liquid holding tank. The apparatus includes a mist elimination chamber 10 through which the air flows just prior to its release to the open atmosphere. The mist elimination chamber 10 includes a central cylindrical portion 12 which is capped by a substantially conical upper portion 14 which converges as it extends upwardly from the cylindrical portion until it is joined with a cylindrical exit portion 16 which forms the uppermost extremity of the mist elimination chamber 10. A substantially conical lower portion 18 is joined to the cylindrical portion 12 and converges as it extends downwardly from the cylindrical portion 12. The lower portion 18 is joined to a cylindrical gas entry portion 20 which forms the lowermost extremity of the mist elimination chamber 10.

A first planer annulus 22 is positioned about the circumference of the mist elimination chamber central portion 12 and forms the upper boundary for an annular gas circulation pathway about the exterior of the mist elimination chamber. The lower boundary of the gas circulation pathway is formed by a second planer annulus 24 which surrounds the mist elimination chamber in close proximity to the boundary between the central portion 12 and the lower conical portion 18. The first planer annulus 22 abuts an exterior surface of the boundary wall of the mist elimination chamber 10; however, the second planer annulus 24 is spaced a predetermined distance from the wall of the mist eliminator chamber to provide an opening through which a stream of gas and entrained liquid can pass from the gas circulation pathway along the lower portion of the mist elimination chamber conical section 18.

A series of curved deflecting vanes 26a through h are mounted between the first and second planer annuli 22 and 24 and coincidentally form an outer boundary for the gas circulation pathway and entry openings into the gas circulation pathway. The arrangement of the deflecting vanes 26a through h can best be seen in FIG. 2. The vanes are arranged so that a first end, 28a through h respectively, of each of the vanes is closer to the wall of the central portion of the mist elimination chamber 10 than is a second end, 30a through h respectively, of each of the respective vanes 26a through h. The vanes are arranged circumferentially about the mist elimination chamber and the entrance opening to the gas circulation pathway is formed between the first end and the second end of adjacent ones of vanes 26a through h.

A cylindrical skirt 32 is suspended from the lower planer annulus 24. The diameter of the cylindrical skirt 32 is greater than the diameter of the cylindrical portion 12 and less than the outer diameter of the second planer annulus 24. A conical liquid collection wall 34 is affixed to the skirt 32 and converges as it extends from the skirt downwardly as viewed in FIG. 1. The liquid collection plate 34 is spaced from the exterior of the boundary wall of the conical lower portion 18 of the mist elimination chamber and an open space for passage of gas from the gas circulation pathway is formed between the exterior of the conical lower portion 18 and an interior surface of the liquid collection plate 34. A liquid exit opening 36 is formed at the truncated apex of the liquid collecting plate 34.

The preferred embodiment of the liquid/gas separator of the present invention is pictured in FIG. 1 mounted in an opening formed in an upper wall 38 of a liquid collecting tank which can serve as the waste holding tank of a vacuum flush toilet system. The first planer annulus 22 overlies a portion of the upper wall 38 of the liquid holding tank surrounding the opening in which the liquid gas separator is placed. Preferably a gas and liquid tight seal is formed between the first planer annulus 22 and the upper wall 38 so that liquid and gas within the liquid holding tank cannot pass between them. A waste discharge pipe 40 passes through a second opening in the upper wall 38 of the liquid storage tank. The waste discharge pipe 40 could come from any source of liquid and gas and in the environment described above would come from the toilet(s) of a vacuum flush toilet system of an aircraft. An air, liquid and waste stream enter the tank through the pipe 40. A tank inlet pipe 42 is connected in T fashion to the waste discharge pipe 40 and is best seen in FIG. 2. The tank discharge pipe is curved so that it imparts a directional force on the stream to direct it in a substantially clockwise direction as viewed in FIG. 2.

During a flushing operation of the vacuum flush toilet a liquid/gas mixture from the vacuum toilet system enters the tank and a substantial portion of the liquid entrained in the gas stream drops to the bottom of the tank due to gravity. A gas stream still having some liquid entrained therein moves in a substantially clockwise (as viewed in FIG. 2) direction about the upper portion of the liquid holding tank due to the directional force exerted by the tank inlet pipe 42. As the gas with liquid entrained therein moves about the interior of the tank and around the exterior of the liquid/gas separator, some of the liquid/gas stream enters the gas circulation pathway through the openings formed by deflecting vanes 26 as shown by the arrows, 44 in FIG. 1 and 46 in FIG. 2. As the gas stream enters the gas circulation pathway a substantially counter clockwise (as viewed in FIG. 2) flow direction is imposed upon the gas due to the orientation of the deflecting vanes 26. As the stream circulates through the gas circulation passageway the gas/liquid mixture will move in a downward spiral due to gravitational force so that it will eventually flow substantially tangentially to the inner surface of the liquid collection plate 34. As the stream spirals downwardly, its rotational velocity increases due to the decreasing radius of its path along the liquid collection plate surface 34. The swirling motion of the stream drives the heavier liquid masses onto the interior surface of the liquid collection plate 34, the liquid is then free to flow down the collection plate 34, exit the separator through the exit opening 36 and drop to the bottom of the liquid holding tank. The air with a major portion of the entrained liquid removed moves upwardly into the entry portion 20 of the mist elimination chamber 10 as shown by the arrow 47. The air flows upwardly through the mist elimination chamber and exits the separator through the exit portion 16. The air flows toward the exit portion 16 and eventually to the ambient atmosphere due to the pressure differential between the inside of the tank and atmosphere.

Although the air entering the mist elimination chamber has had a substantial amount of liquid removed from it, smaller droplets of moisture are still entrained in it. Therefore, the mist elimination chamber 10 and particularly the cylindrical portion 12 preferably is filled with a demister, that is, a material which intercepts moisture in the form of mist entrained in the air as it passes through the mist elimination chamber, so that the air exiting through the exit portion 16 is suitably free of any moisture. The demister used must not restrict the air flow through the separator and one preferred material is a commercially available knitted wire mesh mist eliminator substance having a density of 9 pounds per cubic foot which is manufactured and distributed by the Metex Industrial Products Division of Metex Corporation of Edison, N.J. While the metal demister generally performs well, the metal demister is relatively heavy and expensive. Therefore, in an aircraft the demister is typically a nylon or polypropolene knitted mesh because of its lighter weight and lower cost.

As the liquid and waste level in the liquid holding tank increases it can reach a point where the liquid is actually impinging upon the exit opening 36 of the liquid collection plate 34. In order to prevent the liquid when it reaches such a high level from entering the liquid gas separator it is possible to install a flapper valve 50 to cover the exit opening 36. The flapper valve 50 is affixed to an exit portion 52 of the liquid collecting plate 34 by a hinge mechanism which permits it to open and close. The flapper valve 50 and exit portion 52 are enclosed by a shroud 54 affixed to the lower portion of the liquid collecting plate 34 to keep refuse away from the flapper valve and exit opening. The shroud has an opening formed in it to permit air and liquid to flow through the shroud. The flapper valve 50 is attached to the exit portion 42 by a hingepin 56 that permits the flapper to pivot between its opened and closed positions. The flapper is free to pivot and is unbiased however, the travel of the flapper downwardly is limited by abutment of an angle portion 58 of the flapper with the side wall of the shroud 54. Alternatively, a stop pedestal could be mounted within the shroud to limit travel of the flapper valve downwardly. A thin rubber seal 60 is affixed to the upper surface of the flapper valve.

When the system is at rest, i.e., when there is no flushing action taking place, there will be no airflow through the separator. At this time the flapper valve 50 will be spaced from the liquid exit portion and will be abutting the shroud. When flushing takes place an airflow caused by the pressure differential between the interior of the tank and the outside atmosphere will move through the opening in the shroud. The flow will push the flapper valve against the exit portion 52 where it will remain so long as the water build up on top of the flapper does not overcome the pressure differential that closed the flapper. When the flushing cycle is over and the pressure differential ceases, the flapper will swing open under gravitational forces and permit the liquid built-up within the separator to drain to the tank.

The size of the liquid/gas separator and the entry and exit openings thereof along with the proportional spacings of the entries to the gas circulation pathway and the gas circulation pathway itself are dependent upon the desired air flow rates through the liquid/gas separator. When used in a system such as a vacuum flush toilet system, it is necessary that the air leaving the liquid holding tank through the liquid gas separator exit at a rate substantially equal to the entry rate of liquid and gas into the waste holding tank so that the volume of waste entering the tank is compensated for by the exiting gas from the tank. Also the velocity of the stream within the separator must be sufficient to cause liquid from the stream to adhere to the surface of the liquid collection plate. The size and proportions of the separator can therefore be empirically determined for the particular system which it is to be employed. As an example, in a vacuum flush toilet system with an airflow from 0 to 20 lbs./minute through the separator, a pressure drop of less than or equal to 0.5 p.s.i. (1 in. Hg.) and sufficient velocity can be attained using twelve inlets approximately 0.4 in. × 1.3 in. These values are meant to be exemplary only.

In summary, a liquid/gas separator is disclosed herein for mounting directly in a vent opening in a liquid holding tank to separate moisture entrained in a gas stream from the stream prior to exit of the gas from the liquid holding tank. A typical environment in which such a separator is used is in vacuum flush toilet systems to accommodate gas exiting from the liquid storage tank to compensate for the entry of liquid and gas from the waste flush line of the toilet system. The liquid/gas separator includes a gas circulation passage way having entry openings which impart to the gas stream, a curved direction of flow. A liquid collection plate extends downwardly from the gas circulation pathway and is in fluid communication therewith. The liquid collection plate is conical and causes the path traveled by the gas stream to have a decreasing radius. As the gas stream exits the gas circulation pathway it travels in a downward spiral over the liquid collection plate. The swirling motion of the gas separates out much of the liquid from the gas through centrifugal force and deposits the liquid on the surface of the liquid collection plate. The liquid collection plate has an exit opening formed therein through which the liquid which collects on the surface thereof can pass into the liquid holding tank. The gas circulating over the surface of the liquid collection plate then passes through a mist elimination chamber to the ambient atmosphere. Preferably the mist elimination chamber contains an adsorbent material to collect any remaining liquid from the gas. However, the adsorbent material should not substantially restrict air flow through the mist elimination chamber.

Although one embodiment of a liquid/gas separator made in accordance with the present invention has been described and illustrated herein, it should be understood by those of ordinary skill in the art and others that several changes can be made to the illustrated embodiment while remaining within the spirit and scope of the present invention. Therefore, the present invention is to be defined solely with reference to the claims which follow.

The embodiments of the invention in which a property or privilege is claimed are defined as follows:

1. An apparatus for extracting entrained liquid from a gas stream comprising:
   an outer cylindrical wall having a plurality of inlet openings formed therein, said inlet openings permitting the passage of said stream of gas and entrained liquid into the space bounded by said cylindrical wall;
   a plurality of directing vanes associated with said inlet openings and constructed and arranged so as to impart a direction to said gas stream and entrained liquid passing through said inlet openings so that said gas stream upon entering said bounded space travels in a direction substantially tangential to said outer cylindrical wall;
   an inner cylindrical wall having a diameter less than said outer cylindrical wall and positioned coaxially with said outer cylindrical wall, the space between said inner and outer cylindrical walls forming an annular gas circulation pathway through which said gas stream and entrained liquid pass;
   a liquid-collecting cone affixed at its base to a lower edge of said outer cylindrical wall and converging downwardly, said liquid-collecting cone having a liquid outlet formed in its apex;

an inner cone of smaller base diameter and smaller altitude than said liquid-collecting cone oriented concentrically with said liquid-collecting cone and having its base contiguous with a lower edge of said inner cylindrical wall, the space between said liquid-collecting cone and said inner cone being in fluid communication with the space between said outer cylindrical wall and said inner cylindrical wall, such that as said airstream travels through said space between said outer cylindrical wall and inner cylindrical wall it spirals downwardly and enters the space between said liquid-collecting cone and said inner cone, said gas stream travelling in a downwardly spiralling path of decreasing diameter such that the swirling action of said gas stream causes the entrained liquid to collect on an inner surface of said liquid-collecting cone, said liquid that collects on said liquid-collecting cone exiting said cone through said liquid outlet and said inner cone having an inner gas outlet formed at its apex through which said gas stream passes in an upward direction into the space bounded by said inner cone; and a mist elimination chamber affixed to said base of said inner cone and having a gas inlet in fluid communication with the space bounded by said inner cone and a gas outlet in fluid communication with the ambient air such that said gas stream passing through said inner gas outlet in the apex of said inner cone passes through the space bounded by said inner cone and enters said mist elimination chamber through said gas inlet and exits said mist elimination chamber through said gas outlet, said mist elimination chamber containing a liquid adsorbent material for removing remaining liquid particles from said gas stream as it passes through said mist elimination chamber.

2. The apparatus of claim 1 liquid adsorbent material is metal.

3. The apparatus of claim 1 further including a door pivotally mounted on said liquid collection cone adjacent said liquid exit opening said door being movable between a first position in which it blocks said opening and a second position in which it is spaced from said opening.

4. The apparatus of claim 3 further including stop means positioned and arranged with respect to said door for limiting movement of said door as it moves from said first position toward said second position.

5. In a liquid collection tank having a tank inlet through which a gas stream having entrained liquid therein enters the tank and a tank outlet through which said gas stream exits the tank after having the entrained liquid removed therefrom, an improved gas/liquid separation system, said system comprising:

an entry pipe mounted in said tank inlet for introducing the gas stream having entrained liquid therein into said tank, said entry pipe being constructed and arranged to direct said stream in a first direction substantially tangential to an interior surface of said liquid-collection tank; and a separator mounted in said tank outlet for extracting the entrained liquid from said gas stream, said separator including:

(a) an outer cylindrical wall having a plurality of inlet openings formed therein through which said gas stream enters said separator, (b) a plurality of directing vanes associated with said inlet opening and constructed and arranged so as to impart a direction to the gas stream as it passes through said inlet openings so that said gas stream upon entering the space bounded by said outer cylindrical wall travels in a second direction substantially tangential to said cylindrical wall and substantially opposite said first direction, (c) an inner cylindrical wall having a diameter less than the diameter of said outer cylindrical wall positioned coaxially with and spaced from said outer cylindrical wall so that an annular gas pathway is formed between said inner cylindrical wall and said outer cylindrical wall, said gas stream circulating through said pathway upon entering said separator through said inlet openings, (d) a liquid-collecting cone affixed at its base to a lower edge of said outer cylindrical wall and having a liquid outlet at its apex, (e) an inner cone oriented parallel to and spaced from said liquid-collecting cone, said inner cone having its base contiguous with a lower edge of said inner cylindrical wall, said annular gas pathway being in fluid communication with the space between said liquid-collecting cone and said inner cone such that said gas stream spirals downwardly from said gas pathway into the space between said inner cone and said liquid-collecting cone such that the swirling action of the gas stream causes the liquid entrained in said gas stream to collect on an inner surface of said liquid-collecting cone, (f) a gas outlet formed at the apex of said inner cone, said gas outlet being spaced from said liquid outlet, said gas stream after said liquid particles collect on said liquid-collecting cone passing through said gas outlet substantially upwardly into the space interior to said inner cone, (g) a mist elimination chamber having an inlet in fluid communication with the space bounded by said inner cone and an outlet in fluid communication with said ambient air such that said gas stream passing into said space within said inner cone continues into the inlet of said mist elimination chamber and passes to the ambient air through the outlet of said mist elimination chamber, said mist elimination chamber containing a liquid adsorbent material to collect liquid remaining within said gas stream prior to its passage to the ambient air.

6. The liquid collection tank of claim 5 wherein said liquid outlet is in fluid communication with the interior of said tank wherein said and further including a door positioned and arranged with respect to said liquid outlet so as to move between a first position in which it blocks the passage of said liquid through said liquid outlet and a second position in which it permits the passage of liquid.

7. The liquid collection tank of claim 6 further including stop means positioned and arranged with respect to said door for limiting movement of said door as it moves from said first position toward said second position.

* * * * *

UNITED STATES PATENT AND TRADEMARK OFFICE
CERTIFICATE OF CORRECTION

PATENT NO. : 4,385,912
DATED : May 31, 1983
INVENTOR(S) : C. Earl Parrick et al.

It is certified that error appears in the above—identified patent and that said Letters Patent is hereby corrected as shown below:

Column 7, line 38: Claim 2 after "Claim 1" add --wherein said--.

Column 8, line 54: "wherein said" should be deleted.

Signed and Sealed this

Twenty-seventh Day of March 1984

[SEAL]

Attest:

Attesting Officer

GERALD J. MOSSINGHOFF

Commissioner of Patents and Trademarks